United States Patent
Kiick et al.

(10) Patent No.: US 7,568,197 B1
(45) Date of Patent: Jul. 28, 2009

(54) METHOD AND APPARATUS FOR INTERPOSING KERNEL SYMBOLS

(75) Inventors: Chris J. Kiick, Austin, TX (US); Michael T. Clayton, San Francisco, CA (US); Michael S. Walker, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1226 days.

(21) Appl. No.: 10/800,115

(22) Filed: Mar. 12, 2004

(51) Int. Cl.
G06F 9/46 (2006.01)
G06F 9/44 (2006.01)
G06F 9/30 (2006.01)

(52) U.S. Cl. .................. 718/100; 712/216; 719/331

(58) Field of Classification Search .............. 717/127, 717/128, 130, 131, 168; 718/100, 104; 712/216, 712/227; 719/310, 331, 332
See application file for complete search history.

(56) References Cited

U.S. PATENT DOCUMENTS

| | | | | |
|---|---|---|---|---|
| 5,956,507 A | * | 9/1999 | Shearer et al. ............... | 718/104 |
| 5,991,822 A | * | 11/1999 | Mealey et al. ............... | 719/327 |
| 6,769,117 B2 | * | 7/2004 | Moore ........................ | 717/130 |
| 7,415,710 B1 | * | 8/2008 | Yan et al. .................... | 718/105 |

\* cited by examiner

Primary Examiner—Van H Nguyen
(74) Attorney, Agent, or Firm—Osha • Liang LLP

(57) ABSTRACT

In general, the invention relates to a method for loading a kernel module. The method involves loading a preload module into a kernel. Loading the preload module includes creating a dynamic dependency list. Loading the kernel module further includes loading the kernel module comprising a static dependency list into the kernel, and triggering a hook when the static dependency list is reviewed. The module information associated with the kernel is obtained using the hook. Loading the kernel module further includes searching for a dynamic dependency associated with the kernel module in the dynamic dependency list using the module information, and updating the static dependency list with the dynamic dependency to obtain an updated static dependency list if the dynamic dependency associated with the kernel module is present in the dynamic dependency list.

18 Claims, 3 Drawing Sheets

METHOD AND APPARATUS FOR INTERPOSING KERNEL SYMBOLS

BACKGROUND

A kernel is the essential center of a computer operating system, the core that provides basic services for all other parts of the operating system. Typically, the kernel includes an interrupt handler that handles all requests or completed input/output (I/O) operations that compete for the kernel's services, a scheduler that determines which programs share the kernel's processing time, etc. A kernel's services are requested by other parts of the operating system or by application through a specified set of program interfaces sometimes known as system calls. The kernel is typically associated with a symbol table. The symbol table provides an association of a kernel symbol and a kernel symbol definitions. In addition, the kernel typically includes functionality to resolve kernel symbols, i.e., determine which kernel symbol definition to keep if a given kernel symbol is defined multiple times.

In some instances, the functionality of the kernel may be augmented by the addition of kernel modules. The kernel modules are typically added after the kernel has booted using a kernel runtime loader. When the kernel module is loaded, the kernel runtime loader examines the static dependencies of the kernel module and loads the appropriate kernel modules upon which the kernel module being loaded depends. Each time a kernel module is loaded and prior to loading a subsequent kernel module, the symbols present in the kernel module are resolved against the kernel symbol table.

Once all the kernel modules upon which the particular kernel module depends have been loaded, the kernel module is loaded. If the dependencies of a given kernel module change, the kernel module is typically recompiled with the new dependencies and subsequently re-loaded into the kernel.

SUMMARY

In general, in one aspect, the invention relates to a method for loading a kernel module, comprising loading a preload module into a kernel, wherein loading the preload module comprises creating a dynamic dependency list, loading the kernel module comprising a static dependency list into the kernel, triggering a hook when the static dependency list is reviewed, obtaining module information associated with the kernel module using the hook, searching for a dynamic dependency associated with the kernel module in the dynamic dependency list using the module information, and updating the static dependency list with the dynamic dependency to obtain an updated static dependency list if the dynamic dependency associated with the kernel module is present in the dynamic dependency list.

In general, in one aspect, the invention relates to a system comprising a kernel module having a static dependency list and a kernel symbol, a modified kernel runtime loader configured to load the kernel module using the static dependency list, and a preload module comprising a dynamic dependency list, wherein the preload module is configured to install a hook into the modified kernel runtime loader, wherein the hook is configured to update the static dependency list using the dynamic dependency list to obtain an updated static dependency list if a dynamic dependency associated with the kernel module is present in the dynamic dependency list.

In general, in one aspect, the invention relates to a computer system for loading a kernel module, comprising a processor, a memory, a storage device, a computer display, and software instructions stored in the memory for enabling the computer system under control of the processor, to perform loading a preload module into a kernel, wherein loading the preload module comprises creating a dynamic dependency list, loading the kernel module comprising a static dependency list into the kernel, triggering a hook when the static dependency list is reviewed, obtaining module information associated with the kernel module using the hook, searching for a dynamic dependency associated with the kernel module in the dynamic dependency list using the module information, and updating the static dependency list with the dynamic dependency to obtain an updated static dependency list, if the dynamic dependency associated with the kernel module is present in the dynamic dependency list.

In general, in one aspect, the invention relates to a network system having a plurality of nodes, comprising a kernel module having a static dependency list and a kernel symbol, a modified kernel runtime loader configured to load the kernel module using the static dependency list, and a preload module comprising a dynamic dependency list, wherein the preload module is configured to install a hook into the modified kernel runtime loader, wherein the hook is configured to update the static dependency list using the dynamic dependency list to obtain an updated static dependency list if a dynamic dependency associated with the kernel module is present in the dynamic dependency list, wherein the kernel module executes on any node of the plurality of nodes, wherein the modified kernel module runtime loader executes on any node of the plurality of nodes, wherein the preload module executes on any node of the plurality of nodes.

Other aspects of the invention will be apparent from the following description and the appended claims.

DETAILED DESCRIPTION

Figure 1:
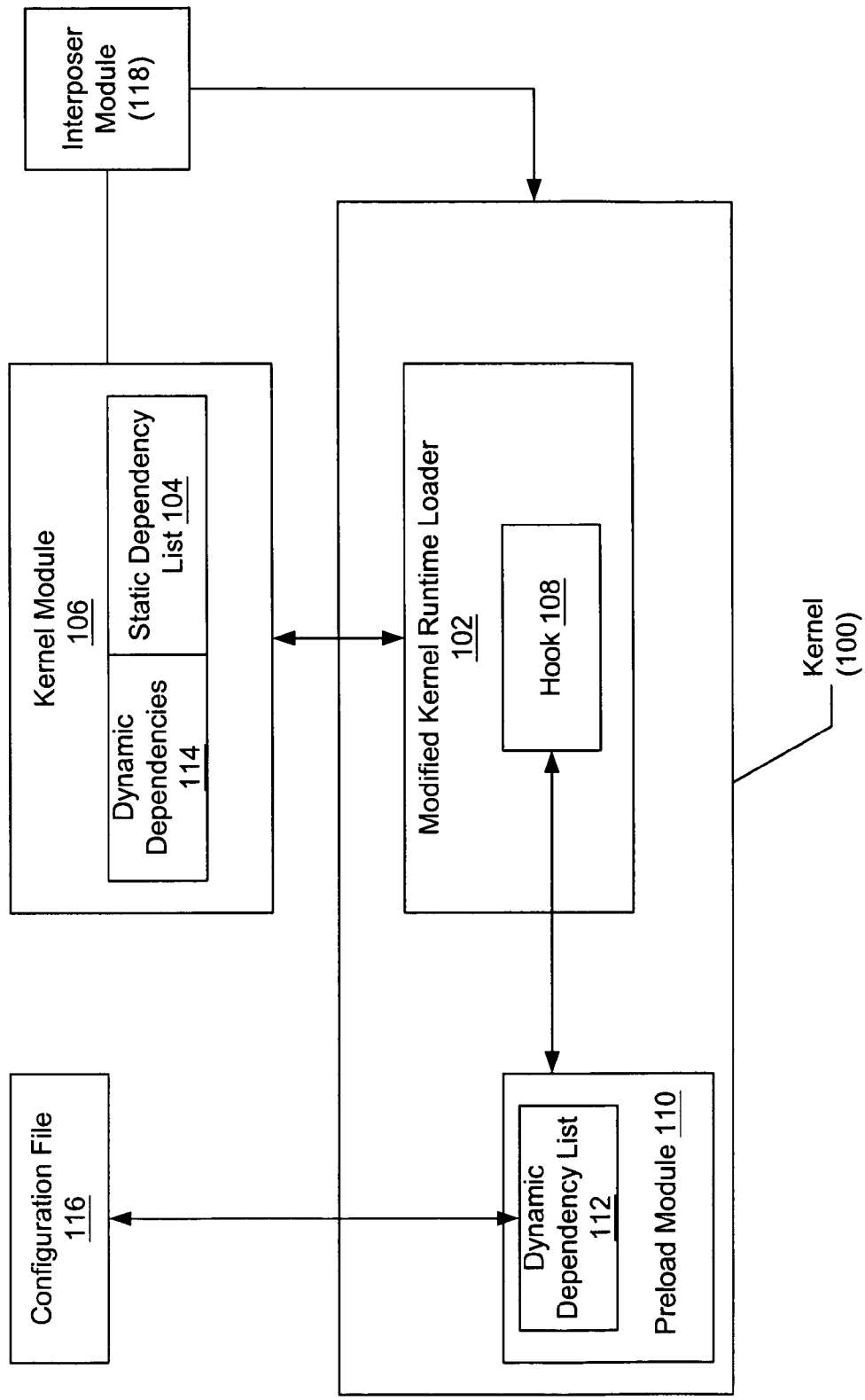
FIG. 1 shows a flow diagram in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for dynamically changing kernel module dependencies. More specifically, embodiments of the invention relate to a method and apparatus for dynamically changing module dependencies without recompiling the kernel module. Further, embodiments of the invention provide a method for interposing of kernel symbols by allowing dependencies of a kernel module to be dynamically updated to depend from an interposing kernel module. Embodiments of the invention also allow multiple definitions of a kernel symbol to operate within the kernel.

FIG. 1 shows a flow diagram in accordance with one embodiment of the invention. In one or more embodiments of the invention, a kernel (100) includes a modified kernel runtime loader (102). The modified kernel runtime loader (102) typically includes functionality to review a static dependency list (104) present in a kernel module (106), which is being loaded into the kernel (100). In addition, the modified kernel runtime loader (102) also includes functionality to allow multiple definitions for a given kernel symbol. Specifically, in one embodiment of the invention, the kernel module (106) includes a flag that signals the modified kernel runtime loader (102) not to check for multiply defined kernel symbols.

The modified kernel runtime loader (102) includes a hook (108) that is triggered when the modified kernel runtime loader (102) is reviewing the static dependency list (104). In one embodiment of the invention, the hook (108) obtains the kernel module (106) information, typically a name and version for the kernel module (106), and forwards this information to a preload module (110). The preload module (110) (typically loaded after the kernel (100) has booted) includes functionality to install the hook (108) into a kernel runtime loader (not shown) to produce the modified kernel runtime loader (102). Further, the preload module (110) typically includes functionality to receive and compare the kernel module (106) information against a dynamic dependency list (112).

In one or more embodiments of the invention, the dynamic dependency list (112) includes the dynamic dependencies of various kernel modules. If the kernel module (106), as identified by the kernel module (106) information, is present on the dynamic dependencies list (112), then the preload module (110) forwards this information to the hook (108). The hook (108), which includes functionality to modify the static dependency list (104), attaches dynamic dependencies (114) to the static dependency list (104). Typically, the dynamic dependencies (114) are inserted at the beginning of the static dependency list (104) such that kernel module (106) will load kernel modules referenced by the dynamic dependencies (114) first.

In one or more embodiment of the invention, the dynamic dependencies list (112) is obtained from a configuration file (116). The dynamic dependencies list (112) may be generated immediately after the preload module (110) is loaded into the kernel (100). In one embodiment of the invention, if the configuration file (116) changes after the preload module (110) has been loaded, the preload module (110) must be unloaded and reloaded into the kernel (100). This allows the preload module (110) to read the updated configuration file (116) and update the dynamic dependency list (112) accordingly.

In one embodiment of the invention, the preload module (110) may be used in combination with an interposer module (118) to intercept kernel function calls. The interposer module (118) may include kernel symbols to be interposed. In one embodiment of the invention, the preload module (110) may specify that the kernel module (106) is dependent on the interposer module (118), thereby forcing the kernel (100) to load the interposer module (118) and allowing the interposer module (118) to redefine one or more kernel symbols used by the kernel module (106) prior to loading the kernel module (106). Thus, when the kernel symbols in the kernel module are resolved, the kernel module uses the kernel symbol definitions specified by the interposer module (118) as opposed to the symbol definitions specified by the kernel (100). Thus, the interposer module (118) allows the kernel symbols to be redefined and subsequently used during symbol resolution of subsequently loaded kernel modules (106).

In one embodiment of the invention, the interposer module (118) includes a reference count that prevents the interposer module (118) from being unloaded while a kernel module (106) that is dependent on the interposer module (118) is still loaded. In one embodiment of the invention, the reference count may be an integer where the value represents the number of kernel modules (106) that are dependent on the interposer module (118). Each time a kernel module (106) that is dependent on the interposer module (118) is loaded into the kernel (100), the reference count is incremented by one. Similarly, each time a kernel module (106) that is dependent on the interposer (118) module is unloaded from the kernel (100), the reference count is decreased by one. The interposer module (118) may only be unloaded from the kernel (100) when the reference count equals zero.

In one embodiment of the invention, the syntax of the configuration file may include one or more lines delimited by semicolons, where each line designates one kernel module to load along with the kernel modules that depend on the kernel module. Each line in the configuration file may include the kernel module name followed by a colon and then one or more dependent kernel module names terminated by a semi-colon. Kernel modules (dependent or otherwise) may be listed more than once as dependencies are additive.

In addition, the syntax of the configuration file may be used to reverse the meaning of the dependency list discussed above. Specifically, the syntax may indicate to the modified kernel runtime loader that a given kernel module is always to be loaded prior to loading any kernel module unless a particular kernel module is being loaded. This functionality may be denoted in the syntax using a "*" (quotes may be included in the configuration file for correct parsing, as required).

The following examples illustrate how the aforementioned syntax may be used, note that the text following the # corresponds to a comment.

| Configuration File Examples |
|---|
| # Example 1 |
| foo:bar;   # kernel module bar is dependent on kernel module foo |
| # Example 2 |
| prefs   : |
|     myfs |
|     yourfs |
|     hisfs; |
| # if any of myfs, yourfs or hisfs is loaded, prefs must be loaded first. |
| #Example 3 |
|     foo : complex; |
|     bar : complex; |
|     baz : complex; |
| # when loading kernel module complex, kernel modules foo bar and baz must be loaded first. |
| #Example 4 |
|     thin : tall fat; |
|     short : tall fat ; |
| # modules tall and fat depend on modules thin and short |
| #Example 5 |
| raboof:   "*" |
|     foo bar baz; |
| #for every kernel module EXCEPT foo, bar and baz, load kernel module raboof |

In one embodiment of the invention, if a syntax error is encountered, the preload module stops reading the configuration file. However, the dynamic dependencies successfully read from the configuration file prior to the error is placed in the dynamic dependencies list within the preload module.

Figure 2:
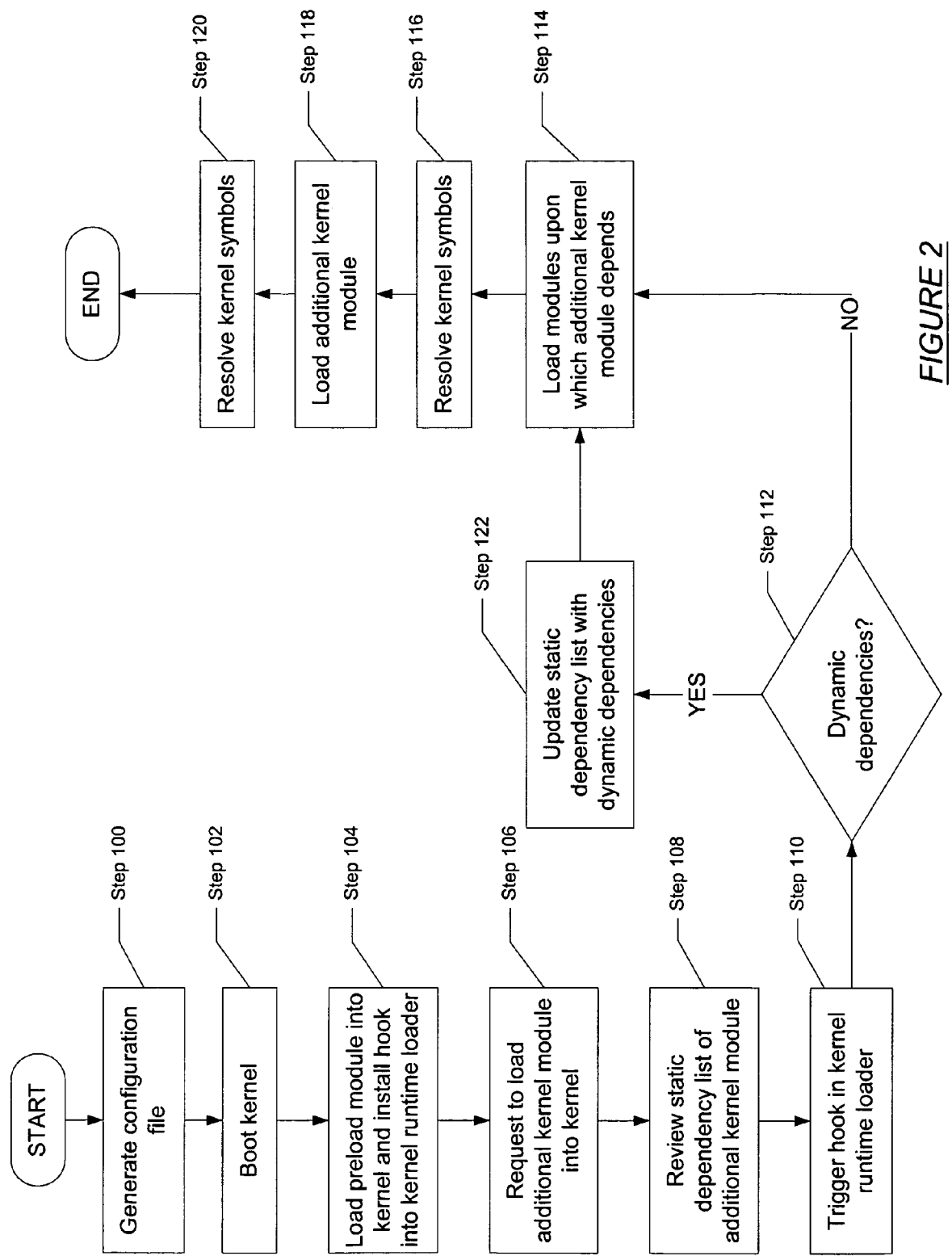
FIG. 2 shows a flow chart in accordance with one embodiment of the invention.

FIG. 2 shows a flow chart in accordance with one embodiment of the invention. Initially, a configuration file defining dynamic dependencies is generated (Step 100). Embodiments of the configuration file may use the syntax described above. The kernel is subsequently booted and a symbol table initialized and populated (Step 102). The configuration file may be defined after the kernel is booted, however, the preload module must be loaded after the configuration file is defined.

The preload module is then loaded into the kernel and, under the direction of the preload module, a hook is installed into the kernel runtime loader to generate a modified kernel runtime loader (Step 104). In addition, when the preload module is loaded, the preload module reads the configuration file into an internal representation of the configuration file (e.g., a dynamic dependencies list). After the kernel has been booted and the preload module has been loaded, a request may be received by the kernel to load an additional kernel module into the kernel (Step 106).

The request to load the additional kernel module into the kernel triggers the modified kernel runtime loader to review the static dependency list in the additional kernel module (Step 108). The review of the static dependency list triggers a hook in the modified kernel runtime loader (Step 110). The hook, in one embodiment of the invention, includes a pointer to the additional kernel module and a call back argument. The hook subsequently obtains the additional kernel module information, typically the name and version of the additional kernel module, and calls into the preload module to determine whether there are any dynamic dependencies associated with the additional kernel module exist (Step 112).

If no dynamic dependencies associated with the additional kernel module, the hook returns control back to the kernel runtime loader which proceeds to load the kernel modules (as required) defined in the additional kernel modules static dependency list (Step 114). The kernel symbols of the loaded kernel modules upon which the additional kernel module depends are subsequently resolved (Step 116). After all the kernel modules upon which the additional kernel module is dependent are loaded and their kernel symbols resolved, the additional kernel module is loaded (Step 118) and the kernel symbols within the additional kernel module are resolved (Step 120).

If there are dynamic dependencies associated with the additional kernel module (Step 112), then the hook obtains the dynamic dependencies from the dynamic dependency list and adds them to the static dependency list thereby updating the static dependency list (Step 122). In one embodiment of the invention, the dynamic dependencies are added to the front of the static dependency list thereby forcing the kernel modules listed in the dynamic dependencies list to be loaded before the kernel modules listed in the static dependencies list. The aforementioned functionality may allow an interposer module to be loaded prior to the additional kernel module. The interposer module may then redefine kernel symbols, which are then subsequently used by the additional kernel module. Continuing with FIG. 2, once the static dependency list has been updated with the dynamic dependencies listed in the dynamic dependency list, Steps 114-120 (listed above) are performed.

As noted above, the kernel module may include a flag that signals the modified kernel runtime loader that multiple kernel symbol definitions are allowed. Though not shown in FIG. 2, one skilled in the art will appreciate that kernel runtime loader may look for a flag to indicate that multiple kernel symbol definitions are allowed prior to steps 116 and 120.

In general, in one aspect, the invention relates to a method for loading a kernel module, comprising loading a preload module into a kernel, wherein loading the preload module comprises creating a dynamic dependency list, loading the kernel module comprising a static dependency list into the kernel, triggering a hook when the static dependency list is reviewed, obtaining module information associated with the kernel module using the hook, searching for a dynamic dependency associated with the kernel module in the dynamic dependency list using the module information, and updating the static dependency list with the dynamic dependency to obtain an updated static dependency list if the dynamic dependency associated with the kernel module is present in the dynamic dependency list.

In general, in one aspect, the invention relates to a system comprising a kernel module having a static dependency list and a kernel symbol, a modified kernel runtime loader configured to load the kernel module using the static dependency list, and a preload module comprising a dynamic dependency list, wherein the preload module is configured to install a hook into the modified kernel runtime loader, wherein the hook is configured to update the static dependency list using the dynamic dependency list to obtain an updated static dependency list if a dynamic dependency associated with the kernel module is present in the dynamic dependency list.

In general, in one aspect, the invention relates to a computer system for loading a kernel module, comprising a processor, a memory, a storage device, a computer display, and software instructions stored in the memory for enabling the computer system under control of the processor, to perform loading a preload module into a kernel, wherein loading the preload module comprises creating a dynamic dependency list, loading the kernel module comprising a static dependency list into the kernel, triggering a hook when the static dependency list is reviewed, obtaining module information associated with the kernel module using the hook, searching for a dynamic dependency associated with the kernel module in the dynamic dependency list using the module information, and updating the static dependency list with the dynamic dependency to obtain an updated static dependency list, if the dynamic dependency associated with the kernel module is present in the dynamic dependency list.

In general, in one aspect, the invention relates to a network system having a plurality of nodes, comprising a kernel module having a static dependency list and a kernel symbol, a modified kernel runtime loader configured to load the kernel module using the static dependency list, and a preload module comprising a dynamic dependency list, wherein the preload module is configured to install a hook into the modified kernel runtime loader, wherein the hook is configured to update the static dependency list using the dynamic dependency list to obtain an updated static dependency list if a dynamic dependency associated with the kernel module is present in the dynamic dependency list, wherein the kernel module executes on any node of the plurality of nodes, wherein the modified kernel module runtime loader executes on any node of the plurality of nodes, wherein the preload module executes on any node of the plurality of nodes.

Figure 3:
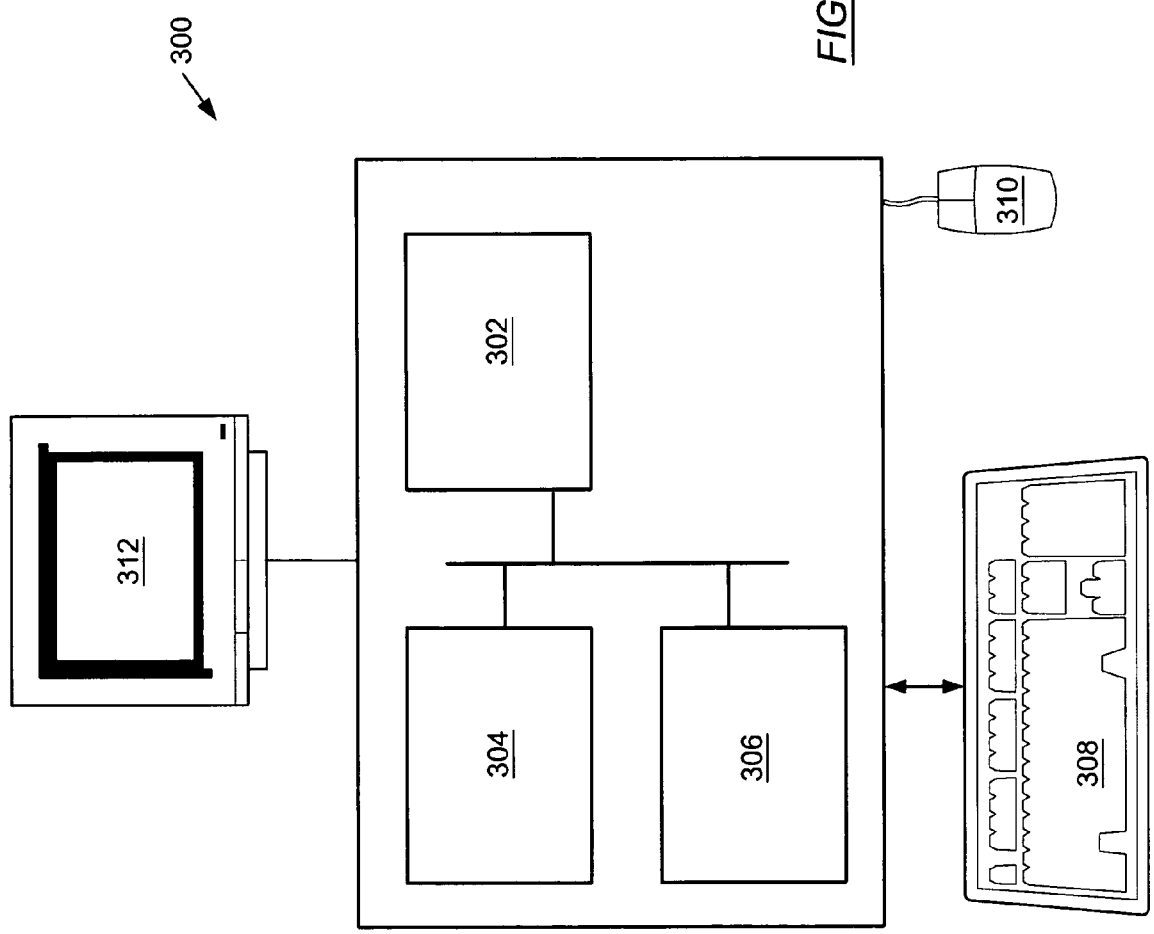
FIG. 3 shows a networked computer system in accordance with one embodiment of the invention.

The invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (300) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for loading a first kernel module, comprising:
    loading a preload module into a kernel, wherein loading the preload module comprises creating a dynamic dependency list;
    loading the first kernel module comprising a static dependency list into the kernel;
    triggering a hook when the static dependency list is reviewed;
    obtaining module information associated with the first kernel module using the hook;
    searching, in the dynamic dependency list, for a dynamic dependency between the first kernel module and a second kernel module using the module information;
    updating the static dependency list with the dynamic dependency between the first kernel module and the second kernel module to obtain an updated static dependency list when the dynamic dependency between the first kernel module and the second kernel module is present in the dynamic dependency list,
    creating an interposer module, wherein the interposer module defines a new kernel symbol definition for a kernel symbol;
    defining a configuration file, wherein the configuration file indicates that the first kernel module is dependent on the interposer module;
    loading the interposer module before the first kernel module using the static dependency list;
    re-defining the kernel symbol using the new kernel symbol definition;
    loading the first kernel module, wherein the first kernel module comprises the kernel symbol; and
    resolving the kernel using the new kernel symbol definition.

2. The method of claim 1, wherein the configuration file is read by the preload module to create the dynamic dependency list.

3. The method of claim 2, further comprising:
    updating the configuration file to obtain an updated configuration file;
    unloading the preload module from the kernel;
    re-loading the preload module into the kernel, wherein re-loading the preload module comprises reading the updated configuration file to generate an updated dynamic dependency list.

4. The method of claim 1, further comprising:
    installing the hook using the preload module.

5. The method of claim 1, wherein the interposer module comprises a reference count.

6. The method of claim 1, wherein the hook is installed in a kernel runtime loader.

7. The method of claim 1, wherein the first kernel module comprises a flag indicating that the kernel symbol may have multiple definitions.

8. The method of claim 1, wherein updating the static dependency list comprises adding the dynamic dependency to the static dependency list.

9. A system comprising:
    a processor;
    a first kernel module executing on the processor and having a static dependency list and a kernel symbol;
    a modified kernel runtime loader configured to load the first kernel module using the static dependency list; and
    a preload module comprising a dynamic dependency list, wherein the preload module is configured to install a hook into the modified kernel runtime loader,
    an interposer module configured to provide a new kernel symbol definition for the kernel symbol, wherein the first kernel module is dependent upon the interposer module,
    a configuration file configured to define a dynamic dependency, wherein the configuration file indicates that the first kernel module is dependent upon the interposer module,
    wherein the hook is configured to update the static dependency list using the dynamic dependency list to obtain an updated static dependency list when the dynamic dependency between the first kernel module and a second kernel module is present in the dynamic dependency list, and
    wherein the kernel symbol is resolved using the new kernel symbol definition.

10. The system of claim 9, wherein the configuration file is used to generate the dynamic dependency list.

11. The system of claim 10, wherein the configuration file is read by the preload module when the preload module is loaded.

12. The system of claim 10, wherein the preload module is unloaded and reloaded when the configuration file is modified.

13. The system of claim 9, wherein the interposer module comprises a reference count.

14. The system of claim 9, wherein the first kernel module comprises a flag indicating that the kernel symbol may have multiple definitions.

15. The system of claim 9, wherein the preload module searches the dynamic dependency list using first kernel module information to determine whether the dynamic dependency associated with the first kernel module is present.

16. The system of claim 9, wherein updating the static dependency list comprises adding the dynamic dependency to the static dependency list.

17. A computer system for loading a first kernel module, comprising:
    a processor;
    a memory;
    a storage device;
    a computer display; and
    software instructions stored in the memory for enabling the computer system under control of the processor, to perform:
        loading a preload module into a kernel, wherein loading the preload module comprises creating a dynamic dependency list;
        loading the first kernel module comprising a static dependency list into the kernel;
        triggering a hook when the static dependency list is reviewed;
    obtaining module information associated with the first kernel module using the hook;

searching, in the dynamic dependency list, for a dynamic dependency between the first kernel module and a second kernel module using the module information;

updating the static dependency list with the dynamic dependency between the first kernel module and the second kernel module to obtain an updated static dependency list, when the dynamic dependency between the first kernel module and the second is present in the dynamic dependency list;

creating an interposer module, wherein the interposer module defines a new kernel symbol definition for a kernel symbol;

defining a configuration file, wherein the configuration file indicates that the first kernel module is dependent on the interposer module;

loading the interposer module before the first kernel module using the static dependency list;

re-defining the kernel symbol using the new kernel symbol definition;

loading the first kernel module, wherein the first kernel module comprises the kernel symbol; and resolving the kernel using the new kernel symbol definition.

18. A network system having a plurality of nodes, comprising:

a first kernel module having a static dependency list and a kernel symbol;

a modified kernel runtime loader configured to load the first kernel module using the static dependency list; and a preload module comprising a dynamic dependency list, wherein the preload module is configured to install a hook into the modified kernel runtime loader, an interposer module configured to provide a new kernel symbol definition for the kernel symbol, wherein the first kernel module is dependent upon the interposer module, a configuration file configured to define a dynamic dependency, wherein the configuration file indicates that the first kernel module is dependent upon the interposer module, wherein the hook is configured to update the static dependency list using the dynamic dependency list to obtain an updated static dependency list when the dynamic dependency between the first kernel module and a second kernel module is present in the dynamic dependency list, wherein the kernel symbol is resolved using the new kernel symbol definition, wherein the kernel module executes on any node of the plurality of nodes, wherein the modified kernel module runtime loader executes on any node of the plurality of nodes, wherein the preload module executes on any node of the plurality of nodes, and wherein each of the plurality of nodes comprises a processor.

* * * * *